United States Patent [19]
Butcher

[11] Patent Number: 4,769,300
[45] Date of Patent: Sep. 6, 1988

[54] A METHOD OF PREPARING A HOLOGRAM HAVING AN INCREASED REPLAY WAVELENGTH AND RESULTING HOLOGRAM

[75] Inventor: David W. Butcher, Goostrey, England

[73] Assignee: Ciba-Geigy Ag, Basel, Switzerland

[21] Appl. No.: 940,048

[22] Filed: Dec. 10, 1986

[30] Foreign Application Priority Data

Dec. 11, 1985 [GB] United Kingdom ................ 8530457

[51] Int. Cl.[4] ......................... G03C 5/24; G03C 1/02; G03H 1/04

[52] U.S. Cl. ........................................... 430/2; 430/1; 430/401; 430/642

[58] Field of Search ........................ 430/1, 2, 401, 642

[56] References Cited

U.S. PATENT DOCUMENTS

| | | | |
|---|---|---|---|
| 3,963,490 | 6/1976 | Graube | 430/2 |
| 3,971,664 | 7/1976 | Nakazawa et al. | 430/2 |
| 4,025,345 | 5/1977 | Kido et al. | 430/1 |
| 4,029,507 | 6/1977 | Wehner et al. | 430/2 X |
| 4,032,348 | 6/1977 | Kido et al. | 430/1 |
| 4,201,441 | 5/1980 | Matsumoto et al. | 430/2 X |
| 4,510,221 | 4/1985 | Gorin et al. | 430/2 X |

FOREIGN PATENT DOCUMENTS

| | | | |
|---|---|---|---|
| 0044457 | 1/1982 | European Pat. Off. | 430/2 |
| 1065818 | 1/1984 | U.S.S.R. | 430/1 |

OTHER PUBLICATIONS

J. W. Gladden, Review of Photosensitive Materials for Halographic Recordings, Technical Report, U.S. Army Engineer Topographic Laboratories, Fort Belvoir, VA, 22060, #ETL-0128, Apr. 1978.

L. H. Lin, Halogen Formation in Hardened Dichramated Gelatin Films, Applied Optics, vol. 8, No. 5, pp. 963-966, May 1969.

*Primary Examiner*—Mukund J. Shah
*Attorney, Agent, or Firm*—Wenderoth, Lind & Ponack

[57] ABSTRACT

Holograms which contain gelatin as the binder are prepared by holographically exposing the holographic material by use of coherent light, developing the holographic image by a chemical or physical process and before processing, simultaneously or subsequently, treating the material with a solution of an onium compound which comprises at least one alkyl group having from 10 to 18 carbon atoms or in which the total number of carbon atoms in the substituent group is at least 15 or a polymeric compound which comprises at least one onium group in the repeating unit.

21 Claims, No Drawings

A METHOD OF PREPARING A HOLOGRAM HAVING AN INCREASED REPLAY WAVELENGTH AND RESULTING HOLOGRAM

The present invention relates to holograms and to their production.

In theory a hologram will replay using white light reconstruction, at about the wavelength of the coherent light which was used in the exposure to prepare it. However in practice, during the processing of sensitised halographic material there is usually some shrinkage of the gelatin binder and this causes, in general, the replay wavelength to be shorter than the wavelength of the laser used in the exposure of the material.

Nevertheless sometimes it is desired that the replay wavelength is longer than the wavelength of the laser used in exposing the material. This is because lasers are expensive and it is desirable that the replay wavelength can be increased to produce a different colour replay hologram using only one laser. Further a He:Ne laser is fairly inexpensive and this emits at 633 nm. However, if it is required to copy a hologram prepared using a He:Ne laser it is more efficient to do so using a pulsed ruby laser which emits at 694 nm. Thus it is desirable that a hologram which was made using a He:Ne laser can replay at 694 nm rather than at 633 nm or less.

In the past some attempt has been made to obtain this bathochromic shift in replay wavelength by treating the hologram with tanning developers such as pyrogallol or inorganic gelatin hardening agents such as aluminium salts, but the results have not been satisfactory. Further it has been found impossible to achieve a bathochromic shift to a desired replay wavelength in a reproducible manner.

Other attempts have been made using organic swelling agents such as triethanolamine, but the effect produced by such agents is not permanent, probably due to the volatility of such swelling agents.

We have found a method of preparing a hologram in which the binder is gelatin and which exhibits a permanent and reproducible bathochromic shift in the replay wavelength.

Therefore according to the present invention there is provided a method of preparing a hologram which uses gelatin as the binder which method comprises halographically exposing the holographic material by use of coherent light, developing the holographic image by a chemical or a physical process and before processing, simultaneously or subsequently, treating the material with solution of an onium compound which comprises at least one alkyl group having from 10 to 18 carbon atoms or in which the total number of carbon atoms in the substituent group is at least 15 or a polymeric compound which comprises at least one onium group in the repeating unit.

Preferably the solution of the compound which comprises the onium group is an aqueous solution.

Preferably the onium group is a quaternary ammonium group. Other onium groups include phosphonium, sulphonium and arsonium.

One class of useful quaternary ammonium compounds have the general formula I:

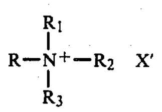

I wherein R is a straight chain alkyl group having 10 to 18 carbon atoms, $R_1$ and $R_2$ are each alkyl groups having 1 or 2 carbon atoms and $R_3$ is either an alkyl group having 1 to 2 carbon atoms, or an aralkyl group or a cycloalkyl group or a group of formula II

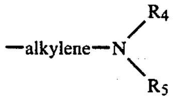

II where $R_4$ and $R_5$ are each alkyl having 1 or 2 carbon atoms, or $R_1$, $R_2$ and $R_3$ represent the atoms necessary to complete a heterocyclic aromatic ring.

Preferably $R_1$ and $R_2$ are each methyl groups.

Preferably X is halogen for example Cl or Br. Another useful anion is methosulphate.

Preferably $R_1$, $R_2$, $R_4$ and $R_5$ an each methyl.

Examples of particularly useful compounds of formula I are: Cetyl pyridinium bromide

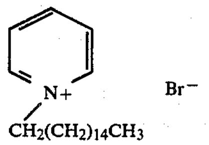

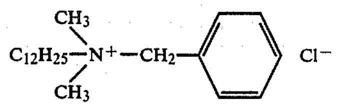

N-dodecyldimethylbenzyl ammonium chloride

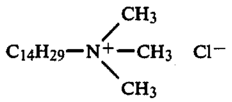

N-myristyltrimethyl ammonium chloride

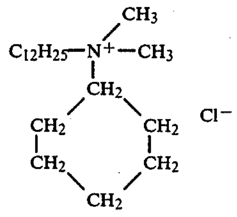

N-dodecyldimethylcyclohexyl ammonium chloride and the compound of the formula III:

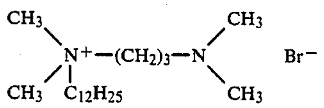

III

Other useful compounds have the general formula IV:

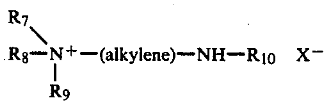

IV where $R_7$ and $R_8$ are each alkyl groups having 1 or 2 carbon atoms, $R_9$ is an optionally substituted alkyl group, (alkylene) is an alkylene radical which may be substitued or interrupted by heteroatoms, $R_{10}$ is a group which comprises an alkyl group having 10 to 18 carbon atoms and X is an anion.

A useful compound of formula IV has the formula:

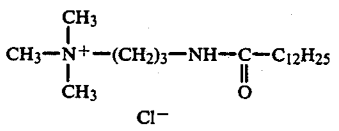

Another class of useful quaternary ammonium compounds have the general formula V:

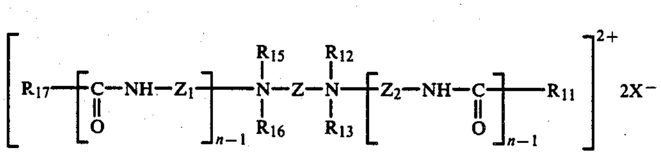

V wherein $R_{17}$ and $R_{11}$ are each aliphatic hydrocarbon radicals containing 12 to 18 carbon atoms, $R_{12}$, $R_{13}$, $R_{15}$ and $R_{16}$ are optionally substituted alkyl, cycloalkyl or aralkyl radicals, Z is an optionally substituted alkylene linking group which may comprise hetero atoms, $Z_1$ and $Z_2$ are alkylene radicals containing 2 or 3 carbon atoms, n is an integer of at most 2 and X is an anion.

Preferably n is 1.

Particularly useful compounds are those wherein $R_{17}$ and $R_{11}$ are each a straight chain alkyl radical having 12 to 18 carbon atoms, Z is a low molecular weight alkylene radical containing 2-4 carbon atoms optionally substituted by hydroxyl groups, $R_{12}$, $R_{13}$, $R_{15}$ and $R_{16}$ are each alkyl groups comprising one or two carbon atoms and X is a halogen atom.

An especially useful compound hereinafter referred to as compound A, has the formula VI:

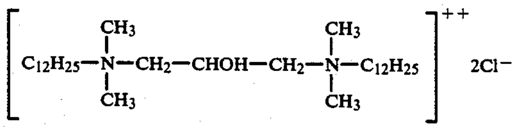

VI

Compounds of the formulae V and VI are described in British patent specification No. 849532.

Polymeric compounds which are related to the bisquaternary compound of formula VI are high molecular weight condensation products formed by reacting a compound of the general formula VII:

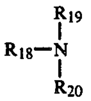

where $R_{18}$ is an alkyl group having 10 to 18 carbon atoms and $R_{19}$ and $R_{20}$ are alkyl groups having 1 or 2 carbon atoms with epichlorohydrin in in the presence of a catalyst to form a compound of the formula VIII:

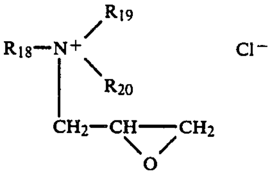

and heating this compound to form a high molecular weight condensation compound.

A useful compound of formula VIII which may be condensed to form a high molecular weight compounds has the formula:

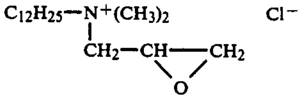

Another useful class of polymeric compounds are prepared by quaternising a diamine of the formula IX:

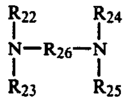

where $R_{22}$, $R_{23}$ $R_{24}$ and $R_{25}$ are each alkyl groups having 1 or 2 carbon atoms and $R_{26}$ is an alkylene group which may be substituted or interrupted with hetero atoms with bischloromethyldiphenyl to yield a polymer having the repeating unit of formula XI

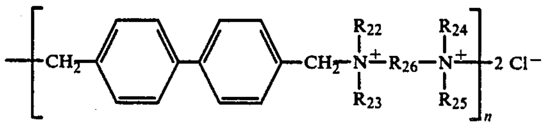

wherein $R_{22}$, $R_{23}$, $R_{24}$, $R_{25}$ and $R_{26}$ have the meanings just assigned to them and n is 10-15.

A particularly useful repeating unit of formula X has the formula:

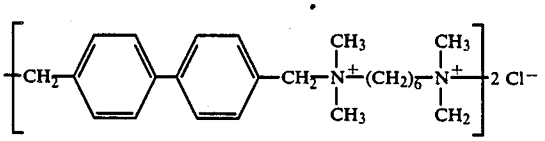

Another polymeric compound having a quaternary ammonium groups in the repeating unit of particular use in the present invention is polydimethyldiallylam monium chloride or bromide. It is prepared by free radical polymerisation of dimethyl diallyl ammonium chloride or bromide. It is thought that the product has the formula:

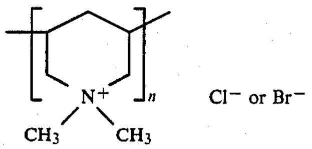

Most of the quaternary ammonium compounds as just described have found use as so called 'retarding agents' in the dyeing of textile materials.

A useful concentration of the solution of onium compounds to use is from 1 to 20 g per 100 ml of water.

Preferred phosphonium compounds have the general formula XII:

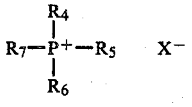

where three of $R_4$, $R_5$, $R_6$ and $R_7$ are optionally substituted phenyl groups and the other of $R_4$, $R_5$, $R_6$ and $R_7$ is an alkyl group or an optionally substituted phenyl group and $X^-$ is an anion.

Preferred arsonium compounds have the general formula XIII

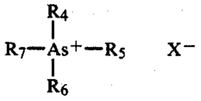

where $R_4$–$R_7$ and $X^-$ are as defined in relation to formula XII.

Preferred sulphonium compounds have the general formula XIV:

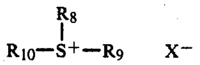

wherein, each of $R_8$, $R_9$ and $R_{10}$ are phenyl or subsituted phenyl groups and $X^-$ is an anion.

The usual processing sequence for a holographic material which uses silver halide as the sensitive system is silver halide development using a silver halide developing agent for example hydroquinone, followed by a silver bleaching process.

The silver bleaching step may be any process of removing the developed silver, but which leaves the unexposed silver halide in situ. It is to be understood that the developed silver may be converted to silver halide some of which may remain in the holographic material.

Examples of bleaching techniques are solvent bleaching methods in which the developed silver is removed from the material and rehalogenating bleaching methods, in which the developed silver is converted to silver halide.

After the holographic exposure the material may be treated with an aqueous solution of the onium compound before development or the onium compound may be present in the silver halide developing solution or in a stop bath between silver halide development and bleaching or in the bleach bath or in a bath in which the material is treated after bleaching.

The bathochromic shift observed does not seem to be greatly affected by the position in the processing sequence in which the material is treated with an aqueous bath of the onium compound. However it is often convenient to treat the material with an aqueous bath of the quaternary ammonium compound after the bleach bath.

If the material is washed subsequent to the treatment bath comprising the onium compound often some initial lessening in the bathochromic shift effect is observed, but this lessening does not increase substantially if the material is washed for a longer time.

The bathochromic shift was found to be independent of the duration of holographic exposure. This is unlike the effect observed when using a tanning developer such as pyrogallol to achieve a bathochromic shift.

The following examples will serve to illustrate the invention.

EXAMPLE I

Samples of holographic material were prepared by coating onto a transparent photographic film base a gelatino silver halide emulsion which was substantially pure silver bromide having a mean crystal size of 0.03 microns at a silver coating weight of 30 mg/dm$^2$. The emulsion was optionally sensitised with a red sensitising dye so that it was optimally sensitive to 633 n.m. the colour of a He:Ne laser.

The material was holographically exposed by a Denisyuk exposure method using a brushed aluminium plate as an object to yield (after processing) a reflective hologram.

The material was then developed for 2 minutes in a solution of the following formulation:

| | |
|---|---|
| Sodium Sulphite Anhydrous | 30 g |
| Hydroquinone | 10 g |
| Sodium Carbonate | 60 g |
| Water to | 1000 ml |

The samples were then transferred to rehalogenating bleach bath of the following composition:

| | |
|---|---|
| Fe($NH_4$)EDTA(1.8 m Solution) | 150 ml |
| KBr | 20 g |
| Water to | 1000 ml |

until all silver metal had been bleached out which was about 2 minutes.

The samples were then water washed in running water for 1 minute and transferred to an aqueous bath which consisted of a 10% by weight solution of compound A for 5 minutes. The pH and temperature of the solution was as set forth in Table 1.

TABLE 1

| Aqueous Solution | pH | Temp °C. | Exposure (Seconds) | Replay λ(nm) | Final Water Wash (mins) | Bathochromic shift λ(nm) |
|---|---|---|---|---|---|---|
| Control | | | 0.5 | 591 | | |
| Compound A | 6.9 | 40 | 0.5 | 728 | 0 | 137 |
| Compound A | 11.0 | 40 | 0.5 | 860 | 0 | 270 |

An exposure of 0.5 seconds in the apparatus used is equivalent to an energy expenditure of 750 $\mu J$.

EXAMPLE II

Samples of holographic material were prepared by coating onto a transparent photographic film base a gelatino silver halide emulsion which was substantially pure silver bromide having a mean crystal size of 0.03 microns at a silver coating weight of 30 $mg/dm^2$. The emulsion was optically sensitised with a red sensitising dye so that it was optimally sensitive to 633 n.m. the colour of a He:Ne laser.

The material was holographically exposed by a Denisyuk exposure method using a brushed aluminium plate as an object to yield (after processing) a reflective hologram.

The material was then developed for 2 minutes in a solution of the following formulation:

| | |
|---|---|
| Sodium Sulphite Anhydrous | 30 g |
| Hydroquinone | 10 g |
| Sodium Carbonate | 60 g |
| Water to | 1000 ml |

The samples were then transferred to rehalogenating bleach bath of the following composition:

| | |
|---|---|
| $Fe(NH_4)EDTA$(1.8 m Solution) | 150 ml |
| KBr | 20 g |
| Water to | 1000 ml |

until all silver metal had been bleached out which was about 2 minutes.

The samples were then water washed in running water for 1 minute and transferred to an aqueous bath which consisted of a 1% by weight solution of cetyl pyridinium bromide for 2 minutes followed by a 20 second wash.

The results were as follows:

TABLE 2

| Aqueous solution | Exposure (seconds) | Replay (nm) | Bathochromic shift (nm) |
|---|---|---|---|
| Control | 1 | 577 | |
| 1% | ¼ | 602 | 25 |
| 1% | ½ | 602 | 25 |
| 1% | 1 | 602 | 25 |

An exposure of 0.5 seconds in the apparatus used is equivalent to an energy expenditure of 750 $\mu J$.

EXAMPLE III

Samples of holographic material were prepared as in Example II. This material was holographically exposed and was developed and subjected to a rehalogenating bleach bath as set forth in Example II.

One sample was then water washed in running water for 1 minute and transferred to an aqueous bath which consisted of a 1% by weight solution of polydimethyldiallyl ammonium chloride for 2 minutes followed by a 20 second wash.

One sample was not treated in this solution but was kept as a control.

The results were as follows:

TABLE 3

| Aqueous solution | Exposure (seconds) | Replay (nm) | Bathochromic shift (nm) |
|---|---|---|---|
| Control | 1 | 577 | |
| 0.5% | 1 | 612 | 35 |

An exposure of 0.5 seconds in the apparatus used is equivalent to an energy expenditure of 750 $\mu J$.

After repeated water washing the replay wavelength remained the same showing that the change in replay wavelength was permanent.

I claim:

1. A method of preparing a hologram which uses gelatin as the binder which method comprises holographically exposing the holographic material by use of coherent light, developing the holographic image by a chemical or a physical process and before processing, simultaneously or subsequently, treating the material with a solution of an onium compound which comprises at least one alkyl group having from 10 to 18 carbon atoms or in which the total number of carbon atoms in the substituent group is at least 15 or a polymeric compound which comprises at least one onium group in the repeating unit.

2. A method according to claim 1 wherein the onium compound is a quaternary ammonium compound.

3. A method according to claim 2 wherein the quaternary ammonium compound has the formula:

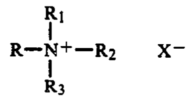

wherein R is a straight chain alkyl group having 10 to 18 carbon atoms, $R_1$ and $R_2$ are each alkyl groups having 1 or 2 carbon atoms and $R_3$ is either an alkyl group having 1 to 2 carbon atoms, or an aralkyl group or a cycloalkyl group or a group of formula:

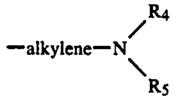

where $R_4$ and $R_5$ an each alkyl groups having 1 or 2 carbon atoms, or $R_1$, $R_2$ and $R_3$ represent the atoms necessary to complete a heterocyclic aromatic ring and $X^-$ is an anion.

4. A method according to claim 3 wherein in the compound of the first mentioned formula $R_1$ and $R_2$ are each methyl groups.

5. A method according to claim 3 wherein the quaternary ammonium compound is cetyl pyridinium bromide, N-dodecylodimethylbenzyl ammonium chloride N-myristyltrimethyl ammonium chloride, N-dodecyldimethylcyclohexyl ammonium chloride or the compound:

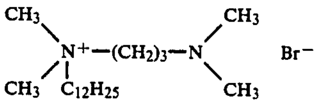

6. A method according to claim 2 wherein the quaternary ammonium compound has the formula:

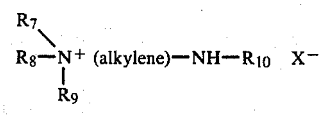

where $R_7$ and $R_8$ are each alkyl groups having 1 or 2 carbon atoms, $R_9$ is an optionally substituted alkyl group, (alkylene) is an alkylene radical which may be substituted or interrupted by heteroatoms, $R_{10}$ is a group which comprises an alkyl group having 10 to 18 carbon atoms and X is an anion.

7. A method according to claim 6 wherein the quaternary ammonium compound is a compound of the formula:

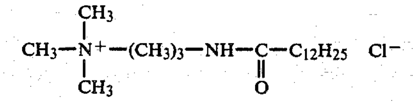

8. A method according to claim 2 wherein the quaternary ammonium compound is a compound of the formula:

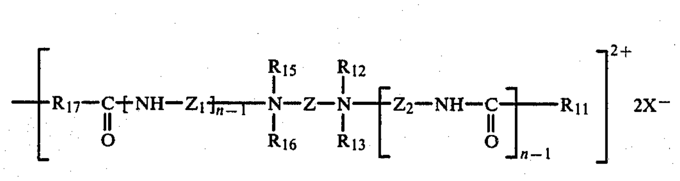

wherein $R_{17}$ and $R_{11}$ are each aliphatic hydrocarbon radicals containing 12 to 18 carbon atoms, $R_{12}$, $R_{13}$, $R_{15}$ and $R_{16}$ are optionally substituted alkyl, cycloalkyl or aralkyl radicals, Z is an optionally substituted alkylene linking group which may comprise hetero atoms, $Z_1$ and $Z_2$ are alkylene radicals containing 2 or 3 carbon atoms, n is an integer of at most 2 and X is an anion.

9. A method according to claim 8 where in the formula set forth therein: $R_{17}$ and $R_{11}$ are each straight chain alkyl radical having 12 to 18 carbon atoms, Z is a low molecular alkylene radical containing 2-4 carbon atoms optionally substituted by hydroxyl groups, $R_{12}$, $R_{13}$, $R_{15}$ and $R_{16}$ are each alkyl groups comprising one or two carbon atoms and X is a halogen atom and n is 1.

10. A method according to claim 9 wherein the quaternary ammonium compound has the formula:

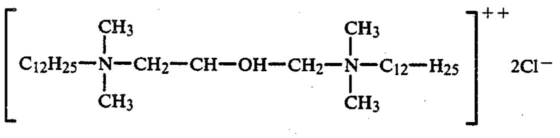

11. A method according to claim 2 wherein the quaternary ammonium compounds used are high molecular weight condensation products formed by reacting a compound of the formula:

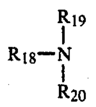

where $R_{18}$ is an alkyl group having 10 to 18 carbon atoms and $R_{19}$ and $R_{20}$ are alkyl groups having 1 or 2 carbon atoms with epichlorhydrin in the presence of a catalyst to form a compound of the formula:

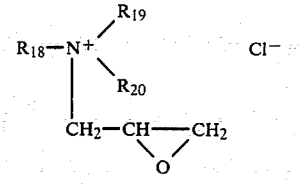

and heating this compound to form a high molecular weight condensation compound.

12. A method according to claim 11 wherein the compound of the last mentioned formula set forth therein has the formula:

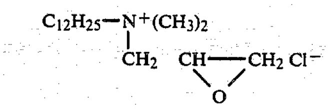

13. A method according to claim 2 wherein the polymeric compound comprising a quaternary ammonium group in the repeating unit is prepared by quaternising a diamine of the formula:

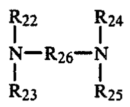

where $R_{22}$, $R_{23}$, $R_{24}$ and $R_{25}$ are each alkyl groups having 1 or 2 carbon atoms and $R_{26}$ is an alkylene group which may be substituted or interrupted with hetero atoms with bischloromethyl diphenyl to yield a polymer having the repeating unit of formula:

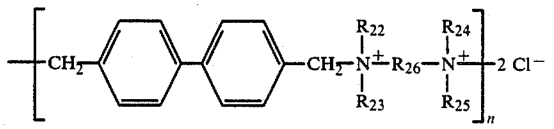

wherein $R_{22}$, $R_{23}$, $R_{24}$, $R_{25}$ and $R_{26}$ have the meanings just assigned to them and n is 10-15.

14. A method according to claim 13 wherein the repeating unit of the polymer has the formula:

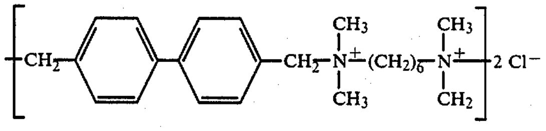

15. A method according to claim 2 wherein the polymeric compound comprising a quaternary ammonium groups in the repeating unit is polydimethyldiallyl ammonium chloride or bromide.

16. A method according to claim 1 wherein the onium compound is a phosphonium comound having the formula:

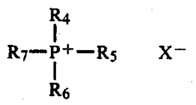

where three of $R_4$, $R_5$, $R_6$ and $R_7$ are optionally substituted phenyl groups and the other of $R_4$, $R_5$, $R_6$ and $R_7$ is an alkyl group having 1 to 18 carbon atoms or an optionally substituted phenyl group and $X^-$ is an anion.

17. A method according to claim 1 wherein the onium compound is an arsonium compound of the formula:

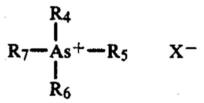

wherein $R_4$-$R_7$ and $X^-$ are as defined in claim 16.

18. A method according to claim 1 wherein the onium compound is a sulphonium compound of the formula:

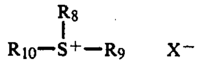

wherein each of $R_8$, $R_9$ and $R_{10}$ are optionally substituted phenyl groups and $X^-$ is an anion.

19. A method according to claim 1 wherein the concentration of the solution of onium compounds used is from 1 to 20 g per 100 ml of water.

20. A method according to claim 1 wherein the hologram is silver halide sensitized wherein after the holographic exposure the holographic material is treated with an aqueous solution of the onium compound before development or the onium compound may be present in the silver halide developing solution or in a stop bath between silver halide development and bleaching or in the bleach bath or in a bath in which the material is treated after bleaching.

21. A hologram prepared by the method according to claim 1.

* * * * *